United States Patent [19]

Sauer

[11] Patent Number: 4,929,002
[45] Date of Patent: May 29, 1990

[54] DEVICE FOR COUPLING A HOSE TO A PIPE

[75] Inventor: Heinz Sauer, Ronneburg, Fed. Rep. of Germany

[73] Assignee: Rasmussen GmbH, Maintal, Fed. Rep. of Germany

[21] Appl. No.: 336,661

[22] Filed: Apr. 11, 1989

[30] Foreign Application Priority Data

Apr. 20, 1988 [DE] Fed. Rep. of Germany ....... 3813192

[51] Int. Cl.$^5$ .............................................. F16L 39/02
[52] U.S. Cl. ....................................... 285/319; 285/94; 285/331; 285/915; 285/921; 285/174; 285/906
[58] Field of Search ............... 285/174, 253, 320, 314, 285/921, 315, 331, 94, 906

[56] References Cited

U.S. PATENT DOCUMENTS 2,386,109 10/1945 Glessner .
3,345,090 10/1967 Weatherhead .
4,708,375 11/1987 Sauer .

FOREIGN PATENT DOCUMENTS 1913919 4/1965 Fed. Rep. of Germany .
1525903 7/1969 Fed. Rep. of Germany .
2557026 6/1977 Fed. Rep. of Germany .
575057 1/1946 United Kingdom .

*Primary Examiner*—Dave W. Arola
*Attorney, Agent, or Firm*—Peter K. Kontler

[57] ABSTRACT

A coupling device for connecting an end of a hose to an end of a pipe having a circumferentially extending collar includes a tubular coupling element with axially spaced ends. A first end of the coupling element is received in the end of the pipe and the coupling element is provided with elastic hooks which engage the collar in order to fix the coupling element. The device further includes a sleeve having a first section which is received in the coupling element and defines therewith an annular space of width approximately equal to the wall thickness of the hose. The sleeve also has a second section which projects from the annular space into the end of the pipe so as to define an annular gap with the latter. The second section of the sleeve is of greater diameter than the first section and abuts the first end of the coupling element. The end of the hose extends into the annular space between the coupling element and the sleeve via the second end of the coupling element, and the hose forms a seal with both the sleeve and the coupling element. The device additionally includes an elastic O-ring which is disposed in the annular gap between the pipe and the second section of the sleeve and bears against the inner surface of the pipe. The O-ring surrounds the second section of the sleeve. In one form of the device, the second section of the sleeve has an axial length at least equal to the thickness of the undeformed O-ring and the O-ring directly contacts the second section so as to form a seal therewith. In a second form of the device, the second section has a first part which is embedded in the first end of the coupling element and a second part which is surrounded by a forward extension of the coupling element. The O-ring here contacts the extension.

26 Claims, 2 Drawing Sheets

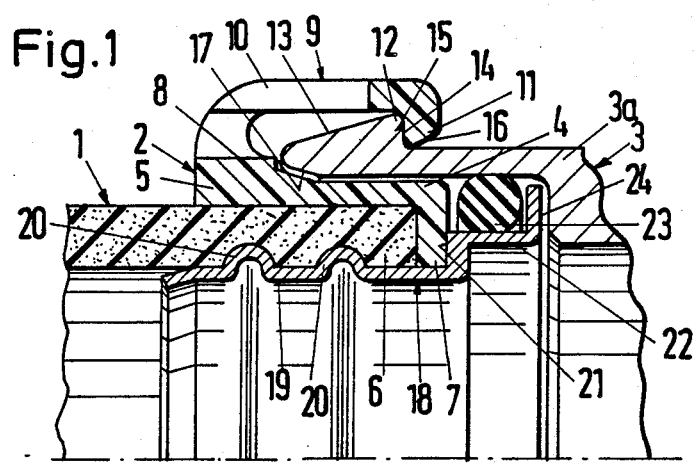
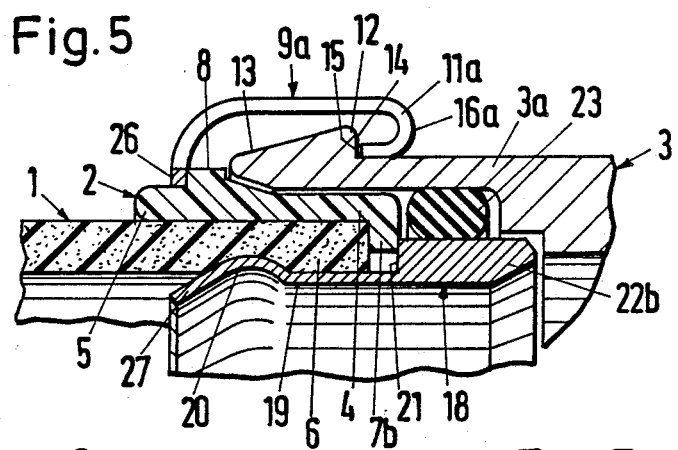
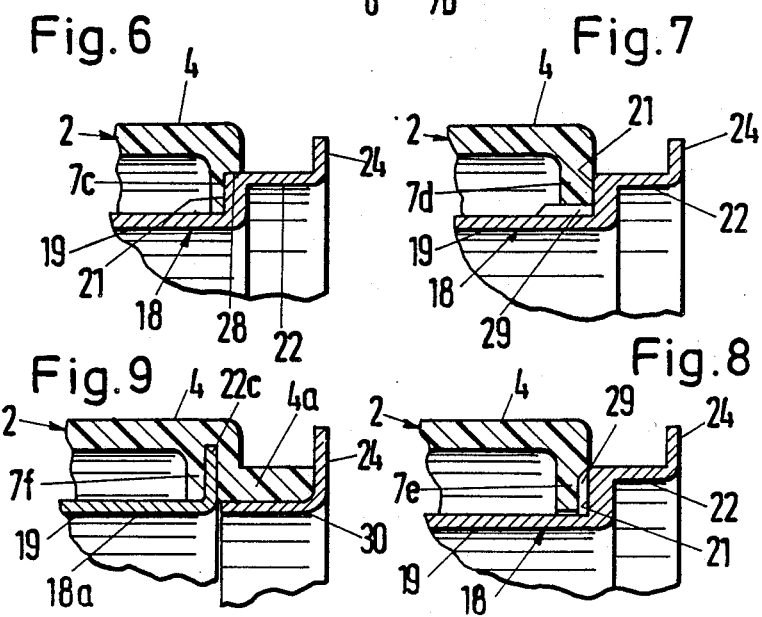

DEVICE FOR COUPLING A HOSE TO A PIPE

BACKGROUND OF THE INVENTION

The invention relates generally to a device for coupling two conduits to one another.

More particularly, the invention relates to a device for coupling a pipe, and especially a nipple, to a hose.

A known device for coupling a pipe to a hose includes a tubular coupling element having a first or front end which is received in the pipe and a second or rear end which is axially spaced from the front end. The coupling element is provided with elastic hooks which project radially outward from the rear end of the coupling element and extend toward the front end at a spacing from the outer periphery of the coupling element. The end of each hook remote from the rear end of the coupling element has a radially inward directed projection or nose which catches elastically behind a collar on the pipe. A first or front end portion of the hose extends into the coupling element via the rear end of the latter and bears tightly against the inner surface of the coupling element. The coupling element has an internal abutment and the front end portion of the hose is fed into the coupling element until the front end portion contacts the abutment. The hose is secured in the coupling element by means of a sleeve or retaining element having a first or rear end section which extends into the front end portion of the hose. The retaining element and the hose engage one another so as to form a seal between the same and the retaining element is fixed against withdrawal from the hose. The retaining element has a second or front end section which projects outward from the hose and has a larger diameter than the rear end section, and the front end section is provided with a radial surface which bears against a radial surface on the front end of the coupling element. A gap exists between the coupling element and the internal surface of the pipe and is sealed via a sealing ring which engages this internal surface.

A coupling device of the above type is disclosed in the commonly owned U.S. Pat. No. 4,708,375. The abutment for the front end portion of the hose is here constituted by a radially inward directed partition or wall of the coupling element. If the material of the abutment and the material at the end face of the hose do not form a bond with one another, which frequently occurs in an attempt to simplify assembly of the coupling element and the hose, there exists the possibility that the liquid, to be conveyed through the pipe and the hose will penetrate between the abutment and the end face of the hose. When the liquid is under pressure and the hose has a textile lining, there is then the danger that the liquid will penetrate into the textile lining axially from the end face of the hose, e.g., by capillary diffusion, so that the inner and outer layers of the hose are separated. This causes the hose to burst within a short time.

OBJECTS OF THE INVENTION

It is an object of the invention to provide a coupling device which makes it possible to connect a pair of conduits relatively simply and with increased reliability.

Another object of the invention to provide a coupling device which enables a pair of conduits to be connected to one another in a relatively simply manner while preventing liquid penetration into undesired locations.

An additional object of the invention to provide a coupling device which allows the likelihood of bursting to be reduced.

A further object of the invention to provide a method which permits a pair of conduits to be coupled to one another relatively simply and reliably.

It is also an object of the invention to provide a coupling device of the type described above which makes it possible to connect a pipe and a textile-reinforced hose in a relatively simple manner while preventing liquid penetration into the hose via the end face thereof.

SUMMARY OF THE INVENTION

The invention resides in a device for joining a first conduit having a collar to a second conduit having a peripheral wall of predetermined thickness, particularly a device for joining a pipe, and especially a nipple, to a hose. A first form of the device comprises a tubular coupling element having a first or front end receivable in the first conduit and a second or rear end which is axially spaced from the front end. The coupling element includes a plurality of hook-like members engageable with the collar on the first conduit. The coupling element is designed to receive the second conduit via the rear end thereof and further includes an abutment for the second conduit. The device additionally comprises a sleeve or tubular retaining element having a first or rear section receivable in the coupling element so as to define therewith an annular spaced designed to accommodate the wall of the second conduit such that the wall forms a seal with both the coupling element and the retaining element. The retaining element further has a second or front section designed to project outward from the annular space into the first conduit, and to define an annular gap with the latter, when the rear section of the retaining element is received in the coupling element. The front end of the coupling element and the front section of the retaining element are provided with complementary surface portions which are arranged to abut one another when the rear section of the retaining element is received in the coupling element. The device also comprises an annular sealing element for sealing the gap between the first conduit and the front section of the retaining element. This sealing element is designed to surround and form a seal with the front section. The sealing element is deformable and has a predetermined width in undeformed condition thereof as considered axially of the coupling element and the front section of the retaining element. The front section has an axial length at least equal to such predetermined width.

In this form of the device, the sealing element prevents the penetration of liquid between the retaining element and the coupling element from the front so that that end face of the second conduit which is disposed in the coupling element can no longer be contacted from the front by the liquid flowing through the conduits.

A second form of the coupling element according to the invention again comprises a tubular coupling element having a first or front end receivable in the first conduit so as to define an annular gap therewith and a second or rear end which is axially spaced from the front end. As before, the coupling element includes a plurality of hook-like members engageable with the collar on the first conduit. The coupling element is once more designed to receive the second conduit via the rear end thereof and includes an abutment for the second conduit. The device also comprises a tubular retaining element having a first or rear section which is received in the coupling element so as to define therewith an annular space designed to accommodate the wall of the second conduit such that the wall forms a seal with both the coupling element and the retaining element. The retaining element further has a second or front section, and this section and the front end of the coupling element are provided with abutting surface portions. The material of the front section of the retaining element forms a bond with the material of the front end of the coupling element so as to establish a connection and a seal between the front section and the front end. The device additionally comprises an annular sealing element for sealing the gap between the first conduit and the front end of the coupling element.

In the second form of the device, also, the liquid is unable to come into contact from the front of the device with that end face of the second conduit which is located in the coupling element.

At least part of the front section of the retaining element may be embedded in the front end of the coupling element in order to form the material-to-material bond and seal between the front section and front end.

The retaining element in a device according to the invention may be designed so that it can be secured against withdrawal from the second conduit. The sealing element may be arranged to bear against the inner surface of the first conduit.

The hook-like members of the coupling element are preferably elastic so that they can elastically catch behind the collar on the first conduit. Each of the hook-like members may include a first portion which extends radially outward of the external peripheral surface of the coupling element in the region of the rear end thereof, and a second portion which is spaced from the peripheral surface and extends from the respective first portion axially of the coupling element in a direction towards the front end. The second portions of the hook-like members have free ends which are spaced from the respective first portions and each hook-like member may further include a radially inward directed projection or nose at the respective free end.

The retaining element may be designed such that the rear section has a smaller diameter than the front section.

The sealing element may be in the form of an O-ring which represents a conventional and simple sealing member.

The internal surface of the coupling element may be provided with one or more ribs which are arranged to engage the outer peripheral surface of the second conduit. The rib or ribs help to fix the axial position of the segment of the second conduit between the coupling element and the retaining element. The ribs or ribs can further function to enhance the seal between the contacting surfaces of the coupling element and the second conduit so that the probability of liquid penetration intermediate these contacting surfaces to that end face of the second conduit disposed in the coupling element is reduced.

The rear section of the retaining element may likewise be provided with one or more radially outward projecting ribs which are arranged to engage the inner surface of the second conduit. As before, such rib or ribs may not only assist in fixing the second conduit axially but may enhance the seal between the contacting surfaces of the second conduit and the retaining element.

The front end of the coupling element may be formed with a radially inward projecting wall or partition which extends circumferentially of the coupling element. The front section of the retaining element has a radial surface as mentioned earlier and this radial surface may bear against the partition in order to axially fix the second conduit which is clamped between the coupling element and the retaining element.

The partition may have an opening and the diameter of such opening may be somewhat larger than the outer diameter of the rib or ribs on the retaining element. This allows the retaining element to be introduced into the coupling element in finished form before the second conduit is inserted into the space between the coupling element and the retaining element.

The retaining element may be designed to be frictionally connected with the partition of the coupling element or, alternatively, the retaining element and the coupling element may be provided with complementary connecting portions. This permits the retaining element to be fixed against rotation relative to the coupling element when the second conduit is turned or twisted, e.g., to facilitate introduction of the second conduit into the space between the coupling element and the retaining element.

The novel features which are considered as characteristic of the invention are set forth in particular in the appended claims. The improved coupling device itself, however, both as to its construction and its mode of operation, together with additional features and advantages thereof, will be best understood upon perusal of the following detailed description of certain specific embodiments when read in conjunction with the accompanying drawings.

BRIEF DESCRIPTION OF THE DRAWINGS

FIG. 1 is an axial sectional view of a coupling device according to the invention as used for joining a hose to a pipe;

FIG. 5 is an axial sectional view of a fourth embodiment of the coupling device in accordance with the invention;

FIG. 6 is a fragmentary axial sectional view of a fifth embodiment of the coupling device according to the invention;

FIG. 7 is a fragmentary axial sectional view of a sixth embodiment of the coupling device in accordance with the invention;

FIG. 8 is a fragmentary axial sectional view of a seventh embodiment of the coupling device according to the invention; and FIG. 9 is a fragmentary axial sectional view of an eighth embodiment of the coupling device in accordance with the invention.

DESCRIPTION OF PREFERRED EMBODIMENTS

Figure 2:
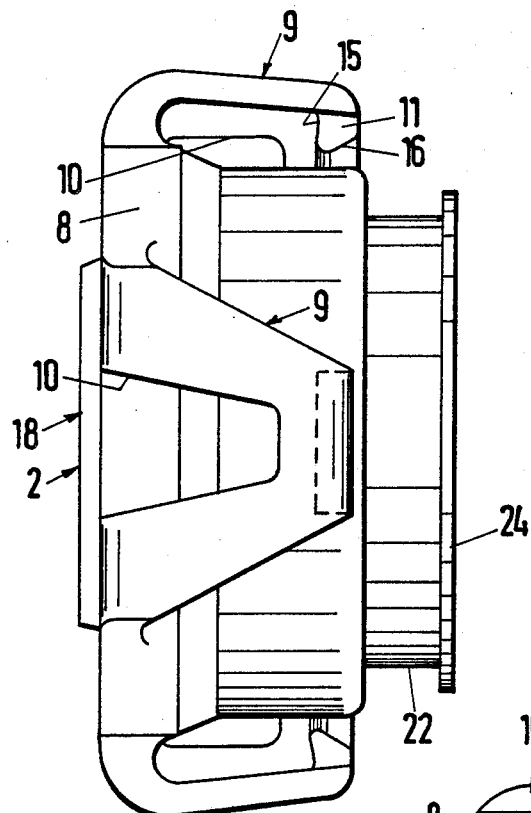
FIG. 2 is a side view of the coupling device of FIG. 1 with the sealing element omitted.

Referring to FIG. 1, the reference numeral 3 identifies a first conduit or pipe which is here assumed to be the nipple of a non-illustrated radiator in the combustion engine of a motor vehicle. The reference numeral 1 identifies a second conduit or hose which here consists of a tubular shell of thermoplastic material and a non-illustrated, woven reinforcing lining of textile fibers. The hose 1 and the pipe 3 are joined to one another by a coupling device in accordance with the invention.

The coupling device includes a generally tubular coupling element 2 made of a harder thermoplastic material than the hose 1. The coupling element 2 has a first or front end 4 and a second or rear end 5 which is spaced from the front end 4 axially of the coupling element 2. The pipe 3 has a rear end portion 3a confronting a front end portion 6 of the hose 1, and the front end 4 of the coupling element 2 has an outer diameter which approximates the inner diameter of, and is received in, the end portion 3a of the pipe 3. The end portion 6 of the hose 1 extends into the coupling element 2 via the rear end 5 of the latter. The coupling element 2 has a radially inward extending partition or wall 7 having a central opening, that is, a partition or wall 7 which is in the form of an annulus extending circumferentially of the coupling element 2. The partition 7 constitutes a stop or abutment for the hose 1 and the front end portion 6 of the hose 1 bears against the partition 7. The hose 1 is elastic and has an outer diameter exceeding the inner diameter of the coupling element 2 so that the front end portion 6 of the hose 1 engages the cylindrical internal surface of the coupling element 2 under an elastic prestress and forms a seal with such surface. The hose 1 engages the coupling element 2 along the rear end 5 and a portion of the front end 4 thereof. The material of the hose 1 does not, however, form a bond with the material of the coupling element 2.

The rear end 5 of the coupling element 2 is provided with a rounded annular flange 8 which extends outwards from the peripheral wall of the coupling element 2 in a radial plane. A plurality of hooks or hook-like elements 9 are attached to the flange 8. Each of the hooks 9 includes a rounded first portion extending radially outwards from the flange 8 and a generally straight second portion which extends from the respective rounded portion in a direction towards the front end 4 of the coupling element 2. The straight portions of the hooks 9 are parallel or approximately parallel to the axis of the coupling element 2 and each of the straight portions has a free end remote from the respective rounded portion. The rear part of each of the straight portions is provided with an axially extending cutout 10 while the free end of each straight portion has a radially inward extending projection or nose 11. The width of the hooks 9 decreases in a direction towards the respective free ends as most clearly shown in FIG. 2.

The rear end portion 3a of the pipe 3 is provided with circumferentially extending collar 12. The collar 12 has an external peripheral surface 13 which tapers conically inwards in a direction from the front to the rear of the pipe 3. The collar 12 further has a radial surface 14 which faces towards the front of the pipe 3 and functions as a security surface. The radial surface 14 of the collar 12 is engaged by cooperating radial surfaces 15 of the noses 11 of the hooks 9.

Each of the noses 11 has a surface 16 which faces radially inward and is inclined to the axis of the coupling element 2 at an angle of about 30°. The tip of the end portion 3a of the pipe 3 likewise has a radially inward facing surface 17 which is inclined to the axis of the pipe 3 at an angle of approximately 15°. The conical peripheral surface 13 of the collar 12 has an angle of inclination of about 21° with respect to the axis of the pipe 3.

After the end portion 6 of the hose 1 has been inserted into the coupling element 2 through the rear end 5 of the latter so that the end portion 6 abuts the partition 7, a first or rear end section 19 of a thin-walled, metallic sleeve or tubular retaining element 18 is introduced into the interior of the end portion 6 through the front end of the coupling element 2 and the opening in the partition 7. Although FIG. 1 shows the rear end section 19 of the sleeve 18 has having radially outward projecting ribs 20 which extend circumferentially of the sleeve 18, these are not yet present at the time that the rear end section 19 is inserted in the front end portion 6 of the hose 1. The sleeve 18 further includes a second or front end section 22 having an outer diameter greater than that of the rear end section 19 and provided with a radial surface 21. The sleeve 18 is pushed into the end portion 6 of the hose 1 until the radial surface 21 abuts the outer radial surface of the partition 7, that is, the radial surface of the partition 7 which faces away from the hose 1. The inner diameter of the partition 7, i.e., the diameter of the opening in the partition 7, is here approximately equal to the outer diameter of the rear end section 19 of the sleeve 18 prior to formation of the ribs 20. The outer peripheral surface of the rear end section 19 engages and forms a seal with the internal surface of the end portion 6 of the hose 1 so that the end portion 6 is clamped between the sleeve 18 and the coupling element 2.

The front end section 22 of the sleeve 18 projects outward from the hose 1 and the coupling element 2 into the interior of the end portion 3a of the pipe 3 and defines an annular gap with the latter. A sealing element 23 in the form of an O-ring is situated in this gap. The O-ring 23 surrounds and forms a seal with the front end section 22 of the sleeve 18 and also bears against the internal surface of the end portion 3a of the pipe 3. The O-ring 23 is elastically deformable and is shown in FIG. 1 in a deformed condition. The diameter of the O-ring 23 in its undeformed condition depends upon the pressure of the liquid in the pipe 3 and the hose 1 and is selected in such a manner that the pressure of the O-ring 23 against the internal surface of the end portion 3a of the pipe 3 is sufficient to prevent penetration of liquid between the O-ring 23 and the internal surface of the end portion 3a. Since the force acting on the inner side of the O-ring 23 is about the same as that acting on the outer side while the contact area between the O-ring 23 and the front end section 22 of the sleeve 18 is smaller than the contact area between the O-ring 23 and the end portion 3a because the inner diameter of the O-ring 23 is smaller than its outer diameter, a satisfactory sealing effect is also obtained at the inner side of the O-ring 23 between the latter and the end section 22. The axial length of the end section 22 is at least equal to the width or thickness of the O-ring 23 in its undeformed condition, i.e., to the dimension of the O-ring 23 as considered axially of the coupling element 2, the sleeve 18, the hose 1 and the pipe 3.

The front end section 22 of the sleeve 18 has a free end remote from the rear end section 19 and this free end is provided with a radially outward projecting flange 24. The flange 24 has an outer diameter smaller than the inner diameter of the end portion 3a of the pipe 3 and serves to axially confine the O-ring 23. Contact between the O-ring 23 and the partition 7, or between the O-ring 23 and the flange 24, in the assembled condition of the coupling device is neither necessary nor contemplated.

After the sleeve 18 has been inserted in the coupling element 2 and the end portion 6 of the hose 1, the ribs 20 are formed by radially pushing out the material of the sleeve 18. This may be accomplished using the method disclosed in the previously mentioned, commonly owned U.S. Pat. No. 4,708,375 and illustrated in FIGS. 6 and 7 thereof. The clamping of the end portion 6 of the hose 1 between the coupling element 2 and the sleeve 18, combined with the increased contact pressure between the hose 1 and the sleeve 18 in the areas of the ribs 20, functions not only to fix the hose 1 axially but also to establish a satisfactory seal between the hose 1 and the sleeve 18. Thus, the liquid cannot travel to the front end face of the hose 1 between the latter and the sleeve 18. Similarly, the O-ring 23 ensures that the liquid cannot travel from the front of the coupling device to the front end face of the hose 1 by passing between the partition 7 of the coupling element 2 and the radial surface 21 of the front end section 22 of the sleeve 18. The inner diameter of the end portion 3a of the pipe 3 is larger than the inner diameter of the remainder of the pipe 3 so that the coupling device does not project radially inward beyond the internal surface of the remainder of the pipe 3 to an excessive degree and does not hinder the flow of liquid.

Figure 3:
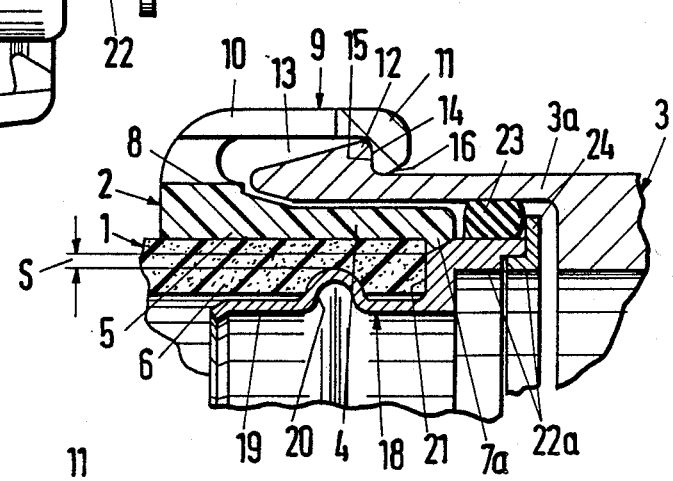
FIG. 3 is an axial sectional view of a second embodiment of the coupling device in accordance with the invention as used for joining a hose to a pipe.

The embodiment of FIG. 3 differs from that of FIGS. 1 and 2 in that the sleeve 18 is provided with only a single retaining and sealing rib 20. Moreover, the partition of the coupling element 2, which is here identified by the reference numeral 7a, has an inner diameter greater than the outer diameter of the rib 20, that is, the diameter of the opening in the partition 7a exceeds the outer diameter of the rib 20. This makes it possible to form the rib 20 prior to assembly of the sleeve 18 with the coupling element 2 and to then insert the sleeve 18 into the coupling element 2 to the end portion 6 of the hose 1. In order to facilitate insertion of the sleeve 18 into the hose 1, the inner diameter of the hose 1 may be somewhat larger than the outer diameter of the rear end section 19 of the sleeve 18 and at least one of the confronting surfaces of the hose 1 and the end section 19 may be lubricated with a volatile lubricating agent which evaporates after assembly. Such a lubricating agent could be constituted by a non-combustible and non-toxic lubricant which is dissolved in a solvent. The gap which exists intermediate the partition 7a and the rib 20 due to the difference between the inner diameter of the partition 7a and the outer diameter of the rib 20 is denoted by the reference character S in FIG. 3.

The embodiment of FIG. 3 further differs from that of FIGS. 1 and 2 in that the front end section of the sleeve 18, which is here identified by the reference numeral 22a, is assembled from two parts instead of being formed from a single piece of material. Furthermore, while the front end section 22 of FIGS. 1 and 2 abuts the coupling element 2 in a generally radial plane, i.e., in a plane which is generally normal to the axes of the coupling element 2 and the sleeve 18, the front end section 22a of FIG. 3 contacts the coupling element 2 along a conical surface which is inclined to the axes of the coupling element 2 and the sleeve 18 at an acute angle.

Figure 4:
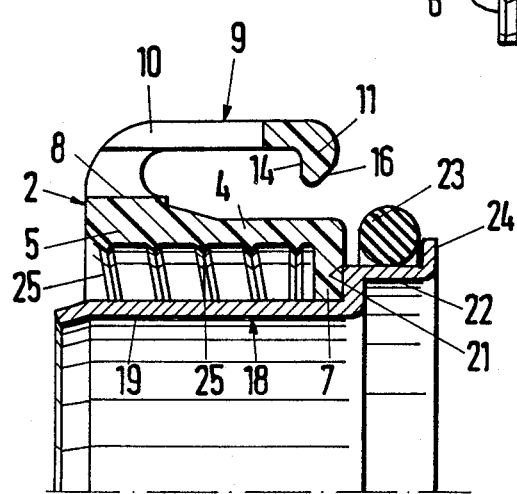
FIG. 4 is an axial sectional view of a third embodiment of the coupling device according to the invention.

The embodiment of FIG. 4 differs from that of FIGS. 1 and 2 only in that the internal surface of the coupling element 2 is provided with one or more retaining ribs 25 which are arranged to contact the outer peripheral surface of the hose 1. Instead of a plurality of discrete ribs 25, the internal surface of the coupling element 2 may be formed with a helical rib extending axially of the coupling element 2. In the condition illustrated in FIG. 4, the rear end section 19 of the sleeve 18 has not yet been provided with a retaining and sealing rib 20. If the coupling element 2 and the rear end section 19 are sufficiently long, the retaining and sealing rib or ribs 20 may be eliminated.

In the embodiment of FIG. 5, the hooks of the coupling element 2, which are denoted by the reference numeral 9a, are integral with a ring 26. The ring 26 is frictionally seated on the external peripheral surface of the rear end 5 of the coupling element 2 and bears against a radially extending rear surface of the annular flange 8. The noses of the hooks 9a, which are identified by the reference numeral 11a, are here in the form of a bend and have correspondingly curved leading or front surfaces 16a. The inner diameter of the partition of the coupling element 2, which partition is denoted by the reference numeral 7b, is again somewhat larger than the outer diameter of the retaining and sealing rib 20. The rear flank of the rib 20 here merges tangentially into a conical rear end portion 27 of the sleeve 18. This rear end portion 27 tapers inward as considered in a direction away from the front end section of the sleeve 18 which is indicated by the reference numeral 22b. The foremost end portion of the end section 22b has an internal surface which tapers conically inward as considered in a direction towards the rear end section 19 of the sleeve 18 while the remainder of the front end section 22b has a substantially uniform inner diameter equal to the inner diameter of that part of the rear end section 19 forward of the rib 20. In this embodiment, the location of the retaining and sealing rib 20 adjacent to the conical end portion 27 of the sleeve 18 can facilitate insertion of the sleeve 18 in the hose 1 if the rib 20 is formed previously. The two-part configuration of the coupling element 2 simplifies the production of the latter using an injection molding process.

In the embodiment of FIG. 6, the partition of the front end 4 of the coupling element 2 is denoted by the reference numeral 7c. This embodiment differs from that of FIGS. 1 and 2 in that the front side of the partition 7c is formed with a cutout. The cutout defines a shoulder 28 which is engaged by the front end section 22 of the sleeve 18 so that the contact area between the partition 7c and the end section 22 is increased. The sleeve 18 and the partition 7c are frictionally connected with each other in order to prevent rotation of the sleeve 18 relative to the coupling element 2. Such relative rotation could occur, for example, when the sleeve 18 is first introduced into the coupling element 2 and the hose 1 is subsequently inserted in the space between the coupling element 2 and the sleeve 18 while rotating or twisting the hose 1 so as to facilitate insertion thereof.

FIG. 7 illustrates an embodiment in which the outer peripheral surface of the rear end section 19 of the sleeve 18 is provided with axially extending teeth which are uniformly distributed in circumferential direction of the end section 19. The partition of the coupling element 2, which is denoted by the reference numeral 7d, is likewise formed with axially extending teeth and these teeth are disposed on that surface of the partition 7d which delimits the opening therein. The teeth on the end section 19 and the partition 7d, which are identified by the reference numeral 29, are in mesh with one another and constitute complementary connecting portions which connect the coupling element 2 and the sleeve 18 to each other. In this manner, the coupling element 2 and the sleeve 18 are locked against relative rotation.

In the embodiment of FIG. 8, the partition of the coupling element 2 is indicated by the reference numeral 7e. Here, the radial surface 21 of the front end section 22 of the sleeve 18 is provided with teeth 29 which now extend radially of the coupling element 2 and the sleeve 18. The teeth 29 engage in respective radial grooves which are formed on the front side of the partition 7e, that is, the side of the partition 7e facing the front end section 22 of the sleeve 18. The teeth 29 and the grooves again constitute complementary connecting portions which lock the coupling element 2 and the sleeve 18 against relative rotation.

Referring to FIG. 9, the partition of the coupling element 2 is identified by the reference numeral 7f and is provided with an annular protuberance 4a constituting a forward extension of the coupling element 2. The sleeve is denoted by the reference numeral 18a and the front end section thereof is made up of a first part 22c and a separate second part 30. The first part of the front end section of the sleeve 18a includes a radially outward projecting flange which is embedded in the partition 7f of the front end of the coupling element 2. Embedding of the flange in the partition 7f may be accomplished, for example, by injecting or molding the material of the partition 7f around the flange when forming the coupling element 2. By embedding the radially outward projecting flange of the first part 22c in the partition 7f, a permanent and complementary fluidtight connection may be established between the coupling element 2 and the sleeve 18a. Thus, the material of the radially outward projecting flange of the first part 22c may form a bond with the material of the partition 7f so as to form a connection and a seal between the partition 7f and the flange.

The outer diameter of the protuberance 4a is smaller than that of the remainder of the front end 4 of the coupling element 2, and the O-ring 23, which is not illustrated in FIG. 9, surrounds the protuberance 4a. The radially outward projecting flange 24 belonging to the front end section of the sleeve 18a and functioning to axially confine the O-ring 23 is provided on the second part 30 of the front end section. The second part 30, which is in the form of a ring, is seated in the protuberance 4a. The ring 30 may be frictionally connected to the protuberance 4a or, alternatively, the ring 30 and the protuberance 4a may be provided with meshing teeth such as the teeth 29 of FIG. 7. It is also possible for either the ring 30 or the protuberance 4a to be provided with teeth and for the other of the ring 30 and the protuberance 4a to be formed with respective grooves for the teeth. Furthermore, instead of dividing the front end section of the sleeve 18a into two separate parts 22c and 30 as illustrated, the ring 30 may be made integral with the part 22c.

Other modifications of the coupling device are possible within the purview of the invention. For instance, the coupling element 2 and the sleeve 18 or 18a may be integral with one another. Moreover, both the coupling element 2 and the sleeve 18 or 18a could be made of a thermoplastic material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A device for joining a first conduit having a collar to a second conduit having a peripheral wall of predetermined thickness, particularly for joining a pipe and a hose, comprising a tubular coupling element having a first end receivable in the first conduit and a second end which is axially spaced from said first end, said coupling element including a plurality of hook-like members engageable with the collar on the first conduit, and said coupling element being designed to receive the second conduit via said second end and further including an abutment for the second conduit; a tubular retaining element having a first section receivable in said coupling element so as to define therewith an annular space designed to accommodate the wall of the second conduit such that the wall forms a seal with both said coupling element and said retaining element, said retaining element further having a second section designed to project outward from the annular space into the first conduit, and to define an annular gap with the latter, when said first section is received in said coupling element, said second section and said coupling element being provided with complementary surface portions which are arranged to abut one another when said first section is received in said coupling element; and an annular sealing element for sealing the gap between said second section and the first conduit, said sealing element being designed to surround and form a seal with said second section, and said sealing element being deformable and having a predetermined width in undeformed condition thereof as considered axially of said coupling element and said second section, said second section having an axial length at least equal to said predetermined width.

2. The device of claim 1, wherein said hook-like members are elastic.

3. The device of claim 1, wherein said coupling element has an external peripheral surface and each of said hook-like members includes a first portion extending radially outward of said peripheral surface in the region of said second end, and a second portion spaced from said peripheral surface and extending from the respective first portion axially of said coupling element in a direction toward said first end, said second portions having free ends which are spaced from the respective first portions, and each of said hook-like members further including a radially inward directed projection at the respective free end.

4. The device of claim 1, wherein said first section has a first diameter and said second section has a larger second diameter.

5. The device of claim 1, wherein said sealing element comprises an O-ring.

6. The device of claim 1, wherein the second conduit has an outer peripheral surface and said coupling element is provided with an internal rib arranged to engage such surface.

7. The device of claim 1, wherein the second conduit has an internal surface and said retaining element is provided with an external rib arranged to engage such surface.

8. The device of claim 1, wherein said first end is provided with a radially inward directed partition extending circumferentially of said coupling element and including said abutment.

9. The device of claim 8, wherein the second conduit has an internal surface and said retaining element is provided with an external rib arranged to engage such surface, said rib having an outer diameter, and said partition being formed with an opening of diameter greater than said outer diameter.

10. The device of claim 8, wherein said retaining element is designed to be frictionally connected to said partition when said first section is received in said coupling element.

11. The device of claim 8, wherein said retaining element and said partition are provided with complementary connecting portions.

12. The device of claim 1, wherein said surface portions are generally radial.

13. A device for joining a first conduit having a collar to a second conduit having a peripheral wall of predetermined thickness, particularly for joining a pipe and a hose, comprising a tubular coupling element having a first end receivable in the first conduit so as to define an annular gap therewith and a second end which is axially spaced from said first end, said coupling element including a plurality of hook-like members engageable with the collar on the first conduit, and said coupling element being designed to receive the second conduit via said second end and further including an abutment for the second conduit; and a tubular retaining element having a first section which is received in said coupling element so as to define therewith an annular space designed to accommodate the wall of the second conduit such that the wall forms a seal with both said coupling element and said retaining element, said retaining element further having a second section, and said second section and said first end being provided with abutting surface portions, the material of said second section forming a bond with the material of said first end so as to establish a connection and a seal between said second section and said first end.

14. The device of claim 13, wherein said hook-like members are elastic.

15. The device of claim 13, wherein said coupling element has an external peripheral surface and each of said hook-like members includes a first portion extending radially outward of said peripheral surface in the region of said second end, and a second portion spaced from said peripheral surface and extending from the respective first portion axially of said coupling element in a direction toward said first end, said second portions having free ends which are spaced from the respective first portions, and each of said hook-like members further including a radially inward directed projection at the respective free end.

16. The device of claim 13, wherein said first section has a first diameter and said second section has a larger second diameter.

17. The device of claim 13, wherein at least part of said second section is embedded in said first end.

18. The device of claim 13, wherein the second conduit has an outer peripheral surface and said coupling element is provided with an internal rib arranged to engage such surface.

19. The device of claim 13, wherein the second conduit has an internal surface and said retaining element is provided with an external rib arranged to engage such surface.

20. The device of claim 13, wherein said first end is provided with a radially inward directed partition extending circumferentially of said coupling element and including said abutment.

21. The device of claim 20, wherein the second conduit has an internal surface and said retaining element is provided with an external rib arranged to engage such surface, said rib having an outer diameter, and said partition being formed with an opening of diameter greater than said outer diameter.

22. The device of claim 20, wherein said retaining element is designed to be frictionally connected to said partition.

23. The device of claim 20, wherein said retaining element and said partition are provided with complementary connecting portions.

24. The device of claim 13, wherein said surface portions are generally radial.

25. The device of claim 13, further comprising an annular sealing element for sealing the gap between the first conduit and said first end.

26. The device of claim 25, wherein said sealing element comprises an O-ring.

* * * * *